US00RE48092E

(19) United States
(12) Reissued Patent
Tompkin et al.

(10) Patent Number: US RE48,092 E
(45) Date of Reissued Patent: Jul. 14, 2020

(54) SPEAKERPHONE

(71) Applicant: Polycom, Inc., San Jose, CA (US)

(72) Inventors: Crispian Tompkin, Los Angeles, CA (US); Luke David Springer, El Segundo, CA (US); Anthony Martin Duys, Merrimac, MA (US); Alexander Baker Ekrut, Austin, TX (US); Richard J. Montague, Cupertino, CA (US); Jochen Eidam, Los Gatos, CA (US)

(73) Assignee: Polycom, Inc., San Jose, CA (US)

(21) Appl. No.: 29/679,618

(22) Filed: Feb. 7, 2019

Related U.S. Patent Documents

Reissue of:
(64) Patent No.: Des. 760,201
Issued: Jun. 28, 2016
Appl. No.: 29/518,227
Filed: Feb. 20, 2015

U.S. Applications:
(62) Division of application No. 29/638,676, filed on Feb. 28, 2018, now Pat. No. Re. 47,282, which is a
(Continued)

(51) LOC (12) Cl. ..... 14-01
(52) U.S. Cl.
USPC ..... D14/221
(58) Field of Classification Search
USPC ..... D14/149, 150, 155, 159, 215, 217, 218, D14/221, 225, 229, 240, 299; D13/108; D21/331
(Continued)

(56) References Cited

U.S. PATENT DOCUMENTS 4,363,482 A 12/1982 Goldfarb
D283,124 S * 3/1986 Kolb ..... D14/210
(Continued)

FOREIGN PATENT DOCUMENTS

TW D108485 8/1994

OTHER PUBLICATIONS

Xing Conference Phone for Skype, <URL: www.ipevo.com>, retrieved from Internet Jan. 31, 2008.
(Continued)

*Primary Examiner* — Philip S Hyder
(74) *Attorney, Agent, or Firm* — Blank Rome, LLP

(57) CLAIM

The ornamental design for a speakerphone, as shown and described.

DESCRIPTION

*This application is a reissue divisional application of U.S. Design application Ser. No. 29/638,676, now U.S. Design Pat. No. Re. 47,282, which issued on Mar. 12, 2019 and is a reissue divisional application of U.S. Design application Ser. No. 29/620,772, now U.S. Design Pat. No. Re. 46,940, which issued on Jun. 20, 2018 and is a reissue of U.S. Design Pat. No. D. 760,201, which issued on Jun. 28, 2016 from U.S. Design application Ser. No. 29/518,227, filed on Feb. 20, 2015, the contents of which applications are entirely incorporated by reference herein.*

FIG. 1 is a perspective view showing a top, a front, and a left side of a speakerphone according to our new design;
FIG. 2 is an elevational view of the front of the speakerphone;
FIG. 3 is an elevational view of a back of the speakerphone;
FIG. 4 is an elevational view of the left side of the speakerphone;
FIG. 5 is an elevational view of a right side of the speakerphone;
FIG. 6 is a plan view of the top of the speakerphone; and,
FIG. 7 is a plan view of a bottom of the speakerphone.
The broken lines showing in FIGS. [1-5 and 7] *1-7* are for illustrative purposes only and form no part of the claimed design.

(Continued)

(Amended)

The grid of circular apertures schematically depicted in FIGS. 1-6 is continuous throughout the surfaces on which the apertures are shown.

1 Claim, 4 Drawing Sheets

Matter enclosed in heavy brackets [ ] appears in the original patent but forms no part of this reissue; matter printed in italics indicates the additions made by reissue.

Related U.S. Application Data division of application No. 29/620,772, filed on May 31, 2017, now Pat. No. Re. 46,940, which is an application for the reissue of Pat. No. Des. 760,201.

(58) Field of Classification Search
CPC . H04M 3/42; H04M 1/20; H04M 1/22; H04R 1/02; H04R 3/00; H04R 1/28
See application file for complete search history.

(56) References Cited

U.S. PATENT DOCUMENTS

D292,090 S * 9/1987 Shintomi ..... D14/141.1
D292,283 S * 10/1987 Matsuda ..... D14/212
D303,522 S * 9/1989 Meda ..... D14/142
4,875,234 A * 10/1989 Tragatschnig ..... H04M 1/02 379/368
D308,701 S 6/1990 Kojima
D309,161 S 7/1990 Leung
D311,541 S 10/1990 Carre
D327,479 S 6/1992 Britz
D332,948 S * 2/1993 Barr ..... D14/392
D342,732 S 12/1993 Hinman et al.
D368,721 S 4/1996 Howell et al.
D375,090 S 10/1996 Lambert et al.
D382,265 S 8/1997 Wakefield
D382,266 S 8/1997 Wakefield
D396,716 S 8/1998 Matsuda et al.
D403,328 S * 12/1998 Wakefield ..... D14/229
D406,841 S 3/1999 Myung
D411,995 S 7/1999 Chen
6,016,346 A 1/2000 Rittmueller et al.
D419,997 S 2/2000 Montalbo et al.
D421,606 S 3/2000 Montalbo et al.
D431,236 S 9/2000 Read et al.
D434,747 S 12/2000 Bird et al.
D439,538 S 3/2001 Lynch
D444,777 S 7/2001 Bird et al.
D448,754 S 10/2001 Chang
D449,285 S 10/2001 Wakefield et al.
D449,286 S 10/2001 Wakefield et al.
D457,150 S 5/2002 Chen
D461,179 S 8/2002 Christianson
D463,410 S 9/2002 Strand et al.
D473,546 S 4/2003 Hovanky et al.
D474,169 S 5/2003 Fletcher
D478,560 S 8/2003 Misrahi et al.
D480,059 S 9/2003 Misrahi et al.
D481,371 S 10/2003 Chen
D488,794 S 4/2004 Chen
D489,358 S * 5/2004 Chen ..... D14/215
D491,909 S 6/2004 Sun
D499,392 S 12/2004 Bathurst et al.
D536,327 S 2/2007 Lukic et al.
D556,179 S 11/2007 Chang
D557,675 S 12/2007 Diebel et al.
D557,676 S 12/2007 Suzuki et al.
D566,682 S 4/2008 Marash
D571,776 S * 6/2008 Duys ..... D14/150
D576,156 S 9/2008 Wilson et al.
D579,911 S * 11/2008 Wei ..... D14/155
7,480,502 B2 * 1/2009 Biddulph ..... H01Q 1/38 343/833
D586,743 S * 2/2009 Guccione ..... D13/107
D594,438 S 6/2009 Wada
D620,916 S * 8/2010 Wada ..... D14/149
D635,955 S * 4/2011 Corrigan ..... D14/149
D674,338 S 1/2013 Au Yeung
D674,374 S 1/2013 Roberts
D714,258 S * 9/2014 Montague ..... D14/221
2003/0053620 A1 3/2003 Chen
2009/0268899 A1 * 10/2009 Tokuda ..... H04M 1/6033 379/420.02

OTHER PUBLICATIONS

Polycom VoiceStation 300, <URL: www.101Phones.com>, retrieved from Internet Jan. 31, 2008.
Polycom SoundStation2, <URL: www.101Phones.com>, retrieved from internet Jan. 31, 2008.

* cited by examiner

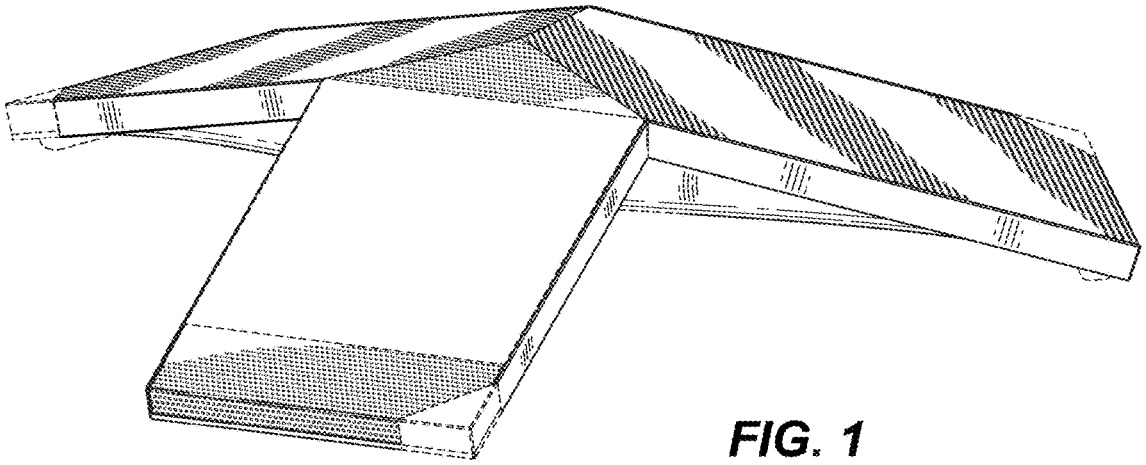
*FIG. 1*
(Amended)
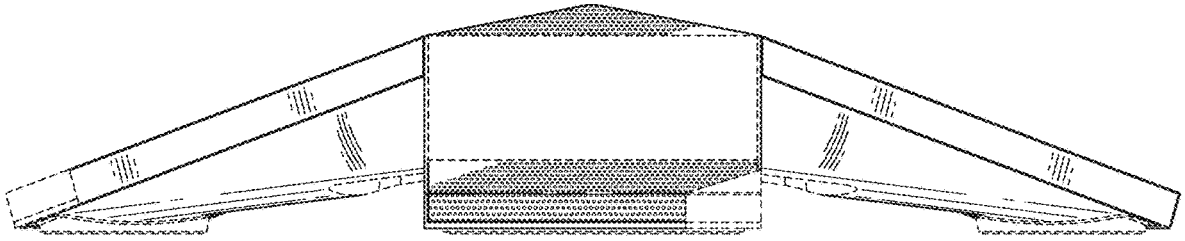
*FIG. 2*
(Amended)

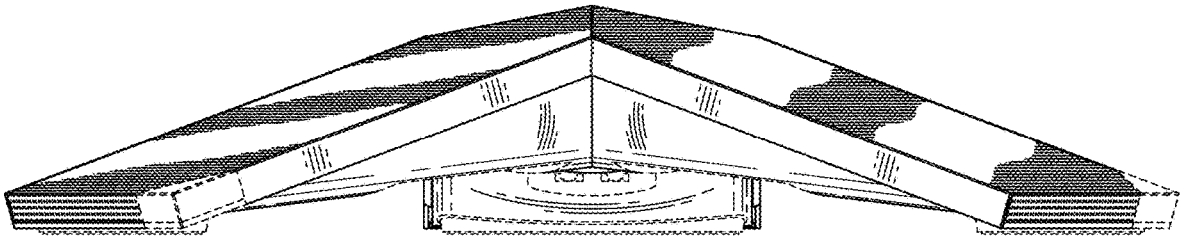
*FIG. 3*
(Amended)
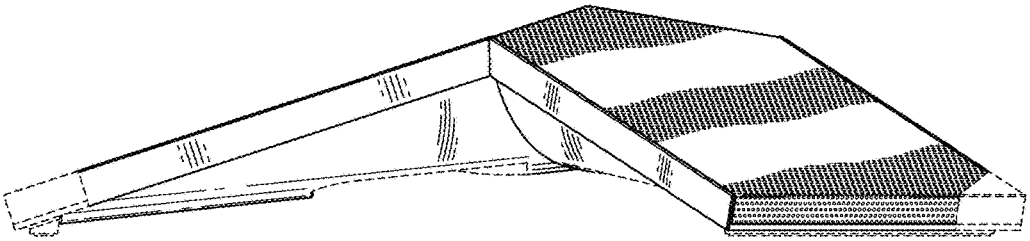
*FIG. 4*
(Amended)
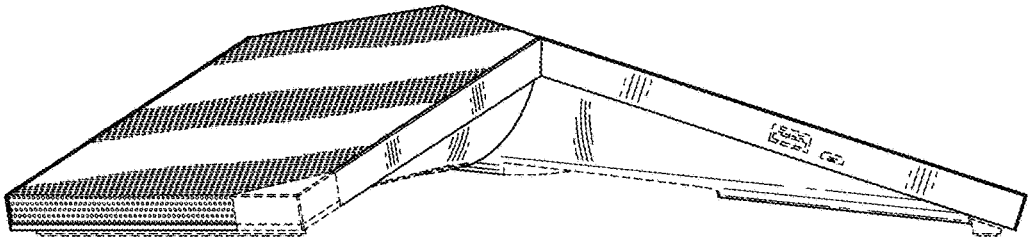
*FIG. 5*
(Amended)

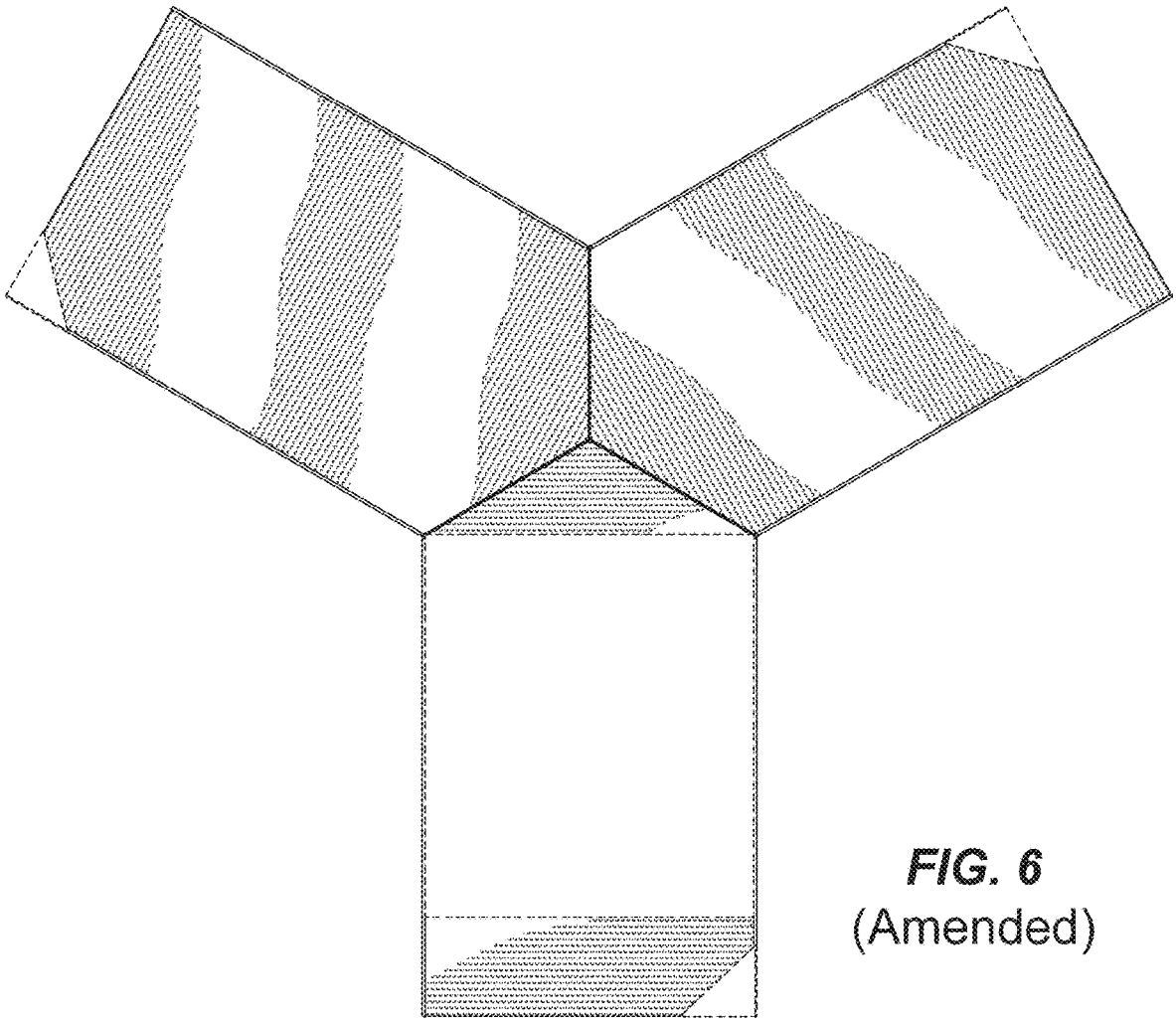
*FIG. 6*
(Amended)

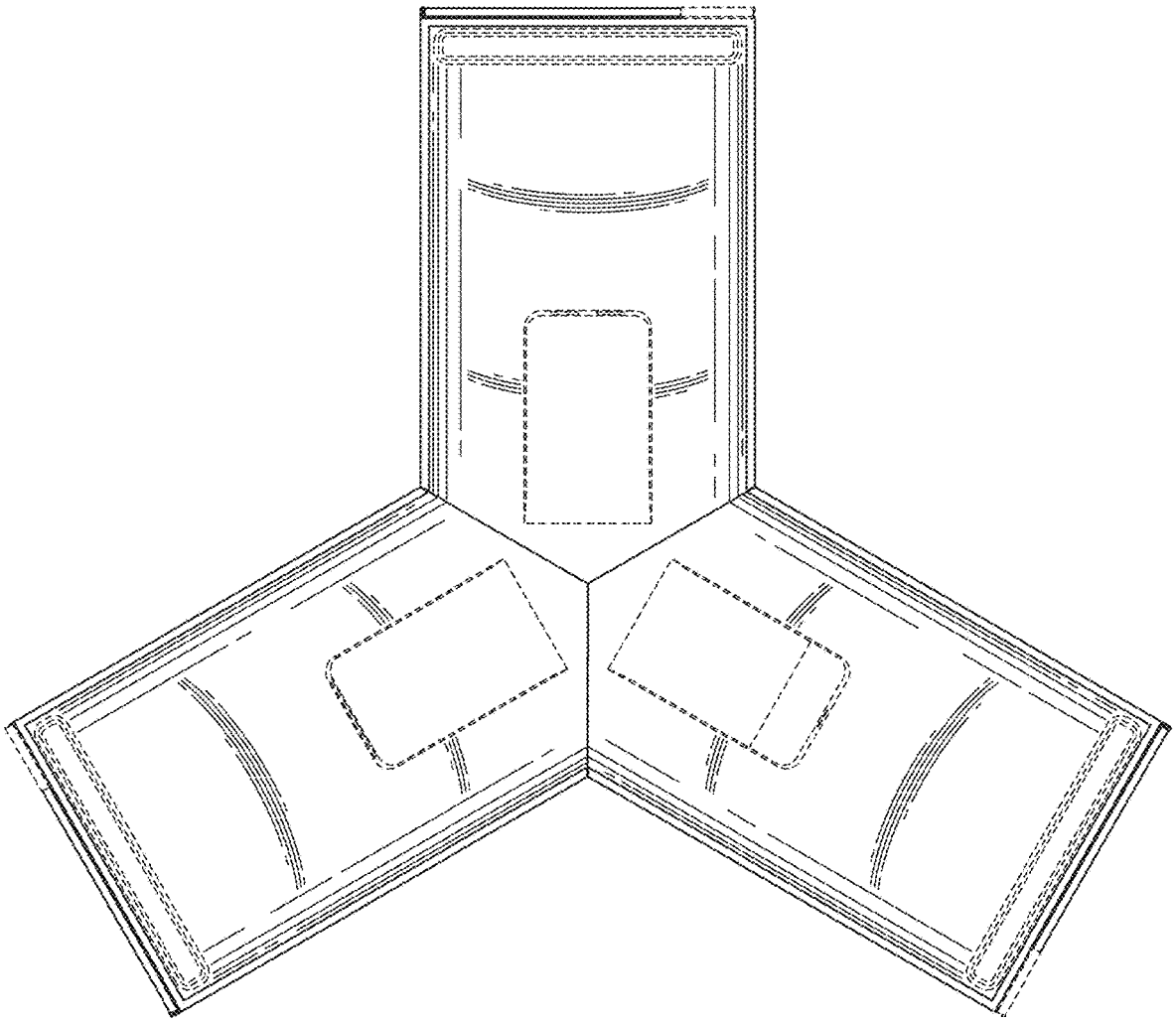
*FIG. 7*
(Amended)